United States Patent
DeMarche et al.

(10) Patent No.: US 6,746,209 B2
(45) Date of Patent: Jun. 8, 2004

(54) METHODS AND APPARATUS FOR COOLING GAS TURBINE ENGINE NOZZLE ASSEMBLIES

(75) Inventors: Thomas Edward DeMarche, Boxford, MA (US); Robert Francis Manning, Newburyport, MA (US)

(73) Assignee: General Electric Company, Schenectady, NY (US)

( * ) Notice: Subject to any disclaimer, the term of this patent is extended or adjusted under 35 U.S.C. 154(b) by 30 days.

(21) Appl. No.: 10/160,548

(22) Filed: May 31, 2002

(65) Prior Publication Data

US 2003/0223862 A1 Dec. 4, 2003

(51) Int. Cl.[7] .................................................. F01D 9/06
(52) U.S. Cl. .................................................. 416/97 R
(58) Field of Search .................. 415/115; 416/96 R, 416/97 R, 97 A, 96 A, 90 R, 90 A, 232

(56) References Cited

U.S. PATENT DOCUMENTS

| | | |
|---|---|---|
| 3,369,792 A | 2/1968 | Kraimer et al. |
| 4,236,870 A | 12/1980 | Hucul, Jr. et al. |
| 4,604,031 A * | 8/1986 | Moss et al. ............... 416/97 R |
| 4,726,104 A | 2/1988 | Foster et al. |
| 5,215,431 A | 6/1993 | Derrien |
| 5,288,207 A | 2/1994 | Linask |
| 5,342,172 A | 8/1994 | Coudray et al. |
| 5,403,159 A | 4/1995 | Green et al. |
| 5,462,405 A | 10/1995 | Hoff et al. |
| 5,503,527 A | 4/1996 | Lee et al. |
| 5,503,529 A | 4/1996 | Anselmi et al. |
| 5,669,759 A | 9/1997 | Beabout |
| 5,772,397 A | 6/1998 | Morris et al. |
| 5,772,398 A | 6/1998 | Noiret et al. |
| 6,132,169 A | 10/2000 | Manning et al. |
| 6,174,135 B1 | 1/2001 | Lee |

* cited by examiner

Primary Examiner—Edward K. Look
Assistant Examiner—Dwayne J. White
(74) Attorney, Agent, or Firm—Nathan D. Herkamp; Armstrong Teasdale LLP; Robert B. Reeser, III

(57) ABSTRACT

A method for fabricating a nozzle for a gas turbine engine facilitates extending a useful life of the nozzles. The nozzle includes an airfoil. The method includes forming the airfoil to include a suction side and a pressure side connected at a leading edge and a trailing edge such that a cooling cavity and a cooling circuit are defined within the airfoil, wherein the suction side and the pressure side extend radially between a tip and a root. The method also includes forming a plurality of cooling slots within the airfoil that extend from the cooling circuit towards the airfoil trailing edge, and forming a control vane within the cooling circuit to facilitate maintaining a substantially constant cooling effectiveness within the cooling circuit.

20 Claims, 4 Drawing Sheets

ND APPARATUS FOR
METHODS AND APPARATUS FOR COOLING GAS TURBINE ENGINE NOZZLE ASSEMBLIES

GOVERNMENT RIGHTS STATEMENT

The United States Government has rights in this invention pursuant to Contract No. DAAH10-98-C-0023.

BACKGROUND OF THE INVENTION

This invention relates generally to gas turbine engine cooling circuits and more particularly, to methods and apparatus for cooling gas turbine engine nozzle assemblies.

Gas turbine engines include combustors, which ignite fuel-air mixtures, which are then channeled through a turbine nozzle assembly toward a turbine. At least some known turbine nozzle assemblies include a plurality of nozzles arranged circumferentially within the engine downstream from the combustors. Each nozzle includes a hollow airfoil vane that extends between integrally-formed inner and outer band platforms. The nozzles are cooled by a combination of internal convective cooling and gas side film cooling.

Each hollow airfoil is supplied cooling air through an internally-defined cavity that is bounded by a pair of connected sidewalls. Cooling of engine components, such as components of the high pressure turbine, is necessary due to thermal stress limitations of materials used in construction of such components. Typically, cooling air is extracted air from an outlet of the compressor and the cooling air is used to cool, for example, turbine nozzles. At least some known turbine nozzles include cooling circuits within the cavity which define flow paths for channeling cooling air flow through the cavity for cooling the airfoil prior to the air flow being discharged downstream through trailing edge slots defined within the airfoil.

Within at least some known airfoil cavities, a serpentine shaped path or channel having multiple chamber passes is defined. Within channel flow circuits, the heat transfer coefficient of coolant flowing through a channel is a function of the local flow velocity in the circuit. Because the metal temperature distribution of a typical vane airfoil is such that the trailing edge is significantly hotter than a temperature of the bulk of the airfoil, at least some known airfoils use turbulence promoters such as pins, turbulators, and other roughening devices to increase the heat transfer coefficient of the coolant flowing through the channel. However, within channel flow circuits, as a portion of the airflow is channeled aftward through the trailing edge slots, a region of low heat transfer coefficient may form near the end of the cooling path. To facilitate cooling in such regions, at least some known airfoils use local film cooling. However, in advanced applications, in which the engine may be operated under extreme heat load conditions, a region of low cooling at the end of a cooling circuit may not be solved by local film cooling, and as a result, may limit the operating range and acceptable applications of the engine.

BRIEF SUMMARY OF THE INVENTION

In one aspect of the invention, a method for fabricating a nozzle for a gas turbine engine is provided. The nozzle includes an airfoil, and the method includes forming the airfoil to include a suction side and a pressure side connected at a leading edge and a trailing edge such that a cooling cavity and a cooling circuit are defined within the airfoil, wherein the suction side and the pressure side extend radially between a tip and a root. The method also includes forming a plurality of cooling slots within the airfoil that extend from the cooling circuit towards the airfoil trailing edge, and forming a control vane within the cooling circuit to facilitate maintaining a substantially constant cooling effectiveness within the cooling circuit.

In another aspect, a turbine nozzle for a gas turbine engine is provided. The nozzle includes an airfoil vane that includes a first wall, a second wall, a plurality of trailing edge cooling slots, and a cooling circuit that extends between the first and second walls. The cooling circuit is upstream from the trailing edge cooling slots for channeling cooling air to the trailing edge cooling slots. The cooling circuit includes at least one control vane extending between the first and second walls. The control vane is arcuate and extends upstream from the trailing edge cooling slots for maintaining a substantially constant cooling effectiveness within said cooling circuit.

In a further aspect of the invention, an airfoil for a gas turbine engine nozzle is provided. The airfoil includes a root, a tip, a cooling circuit, a plurality of trailing edge cooling slots, and a convex sidewall and a concave sidewall that are connected at a trailing edge. The plurality of trailing edge cooling slots extend from the cooling circuit towards the airfoil trailing edge. Each sidewall extends between the root and tip. The cooling circuit is defined between the sidewalls and includes a plurality of pins and a control vane. The plurality of pins and the control vane extend between the sidewalls and define a flowpath for channeling cooling air through the cooling circuit into the trailing edge cooling slots. The control vane is configured to facilitate maintaining a substantially constant cooling effectiveness within the cooling circuit.

DETAILED DESCRIPTION OF THE INVENTION

Figure 1:
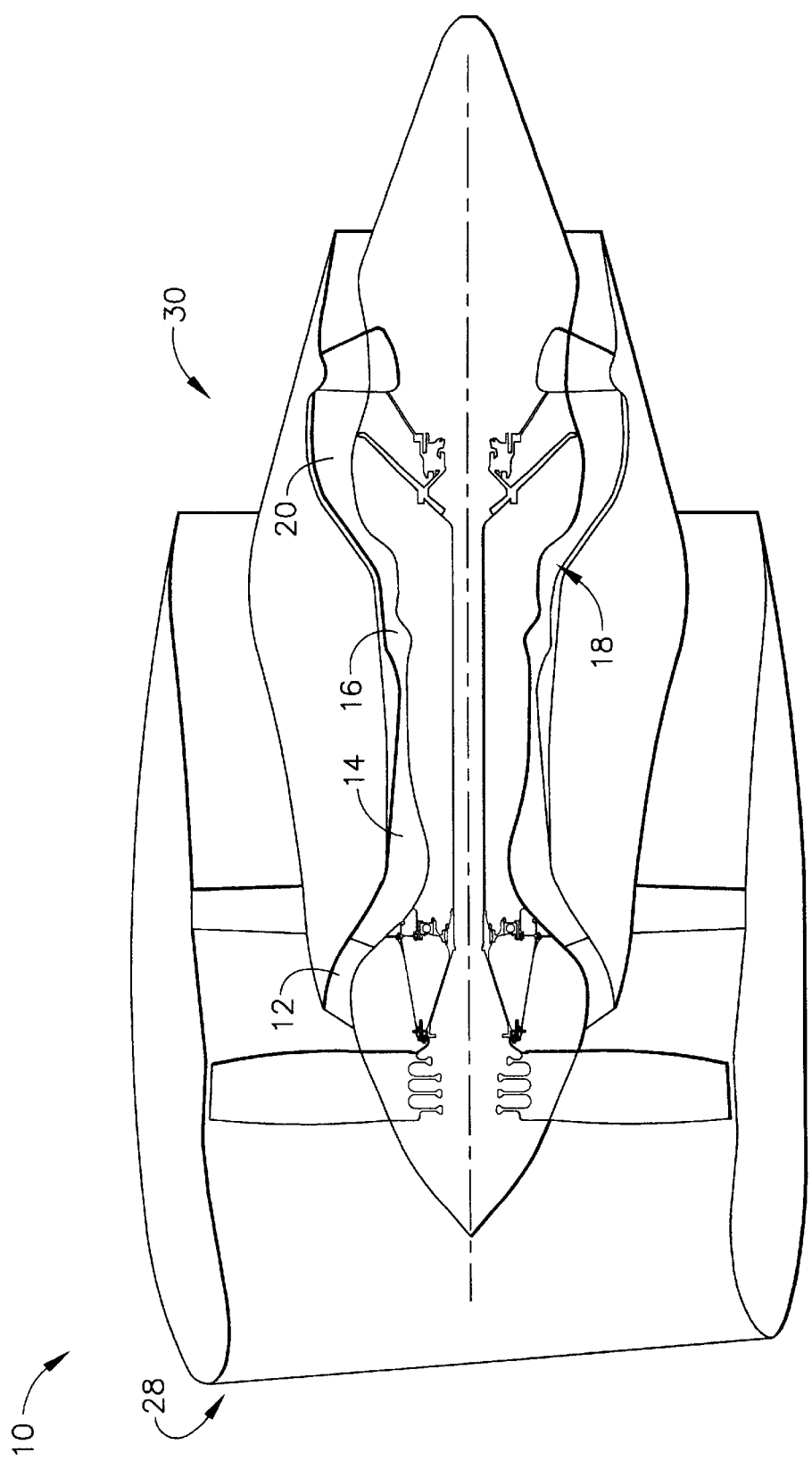
FIG. 1 is a schematic illustration of a gas turbine engine.

FIG. 1 is a schematic illustration of a gas turbine engine 10 including a fan assembly 12, a high-pressure compressor 14, and a combustor 16. Engine 10 also includes a high-pressure turbine 18 and a low-pressure turbine 20. Engine 10 has an intake, or upstream, side 28 and an exhaust, or downstream, side 30. In one embodiment, engine 10 is a CF6-80 engine commercially available from General Electric Aircraft Engines, Cincinnati, Ohio.

In operation, air flows through fan assembly 12 and compressed air is supplied to high-pressure compressor 14. The highly compressed air is delivered to combustor 16. Airflow from combustor 16 is discharged through a turbine nozzle assembly (not shown in FIG. 1) that includes a plurality of nozzles (not shown in FIG. 1) and used to drive turbines 18 and 20. Turbine 20, in turn, drives fan assembly 12, and turbine 18 drives high-pressure compressor 14.

Figure 2:
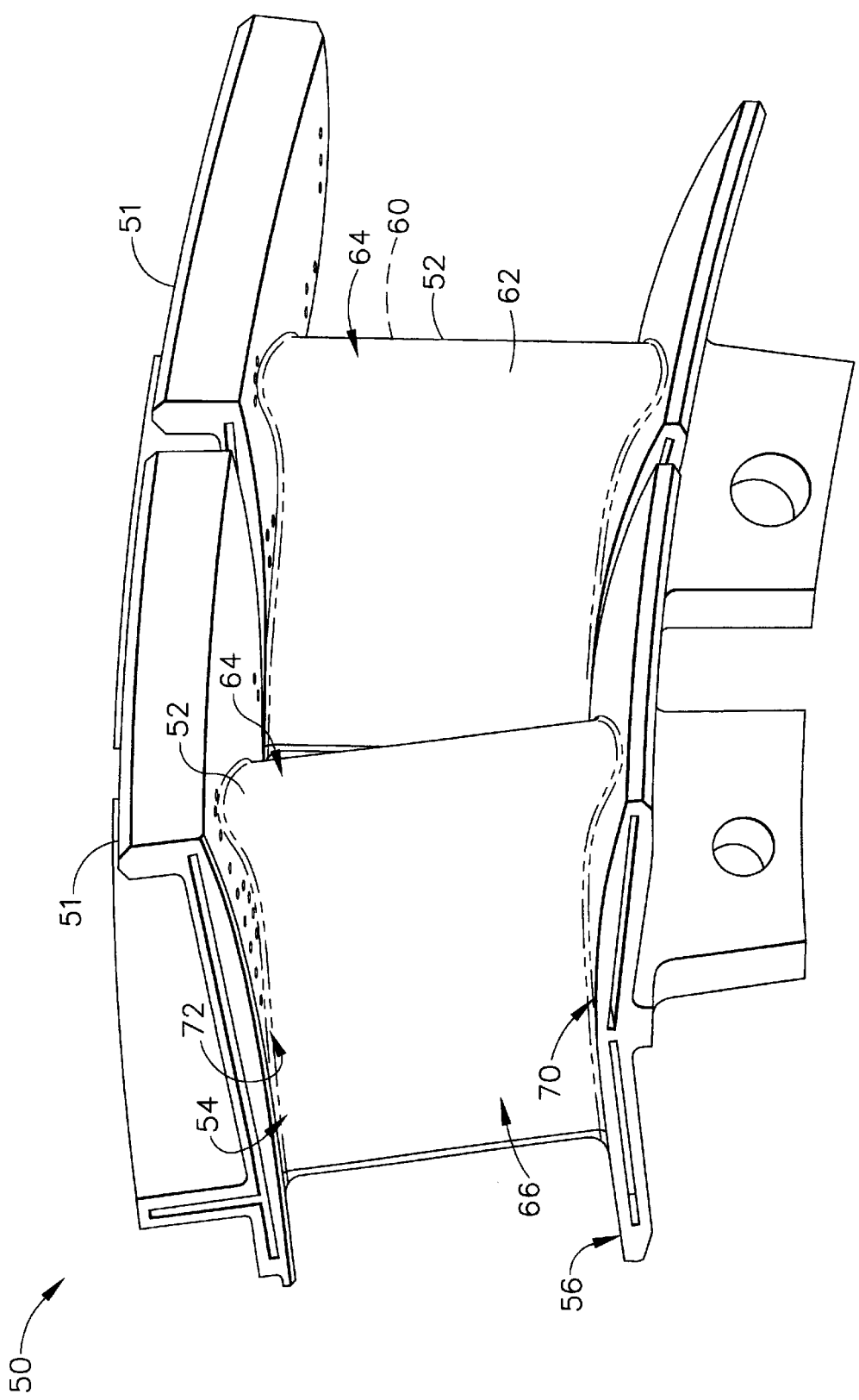
FIG. 2 is a perspective view of a turbine nozzle assembly that may be used with the gas turbine engine shown in FIG. 1.

FIG. 2 is a perspective view of turbine nozzle assembly 50 that may be used with a gas turbine engine, such as engine 10 (shown in FIG. 1). Nozzle assembly 50 includes a plurality of nozzles 51 which extend circumferentially within engine 10. Each nozzle 51 includes an airfoil vane 52 that extends between a radially outer band or platform 54 and a radially inner band or platform 56. More specifically, in the exemplary embodiment, each band 54 and 56 is formed integrally with each airfoil vane 52.

Each airfoil vane 52 includes a first sidewall 60 and a second sidewall 62. First sidewall 60 is convex and defines a suction side of airfoil vane 52, and second sidewall 62 is concave and defines a pressure side of airfoil vane 52. Sidewalls 60 and 62 are joined at a leading edge 64 and at an axially-spaced trailing edge 66 of airfoil vane 52.

First and second sidewalls 60 and 62, respectively, extend longitudinally, or radially outwardly, in span from radially inner band 56 to radially outer band 54. An airfoil vane root 70 is defined as being adjacent inner band 56, and an airfoil vane tip 72 is defined as being adjacent outer band 54. Additionally, first and second sidewalls 60 and 62, respectively, define a cooling cavity (not shown in FIG. 2) within airfoil vane 52. More specifically, the cooling cavity is bounded by an inner surface (not shown) of each respective sidewall 60 and 62.

Figure 3:
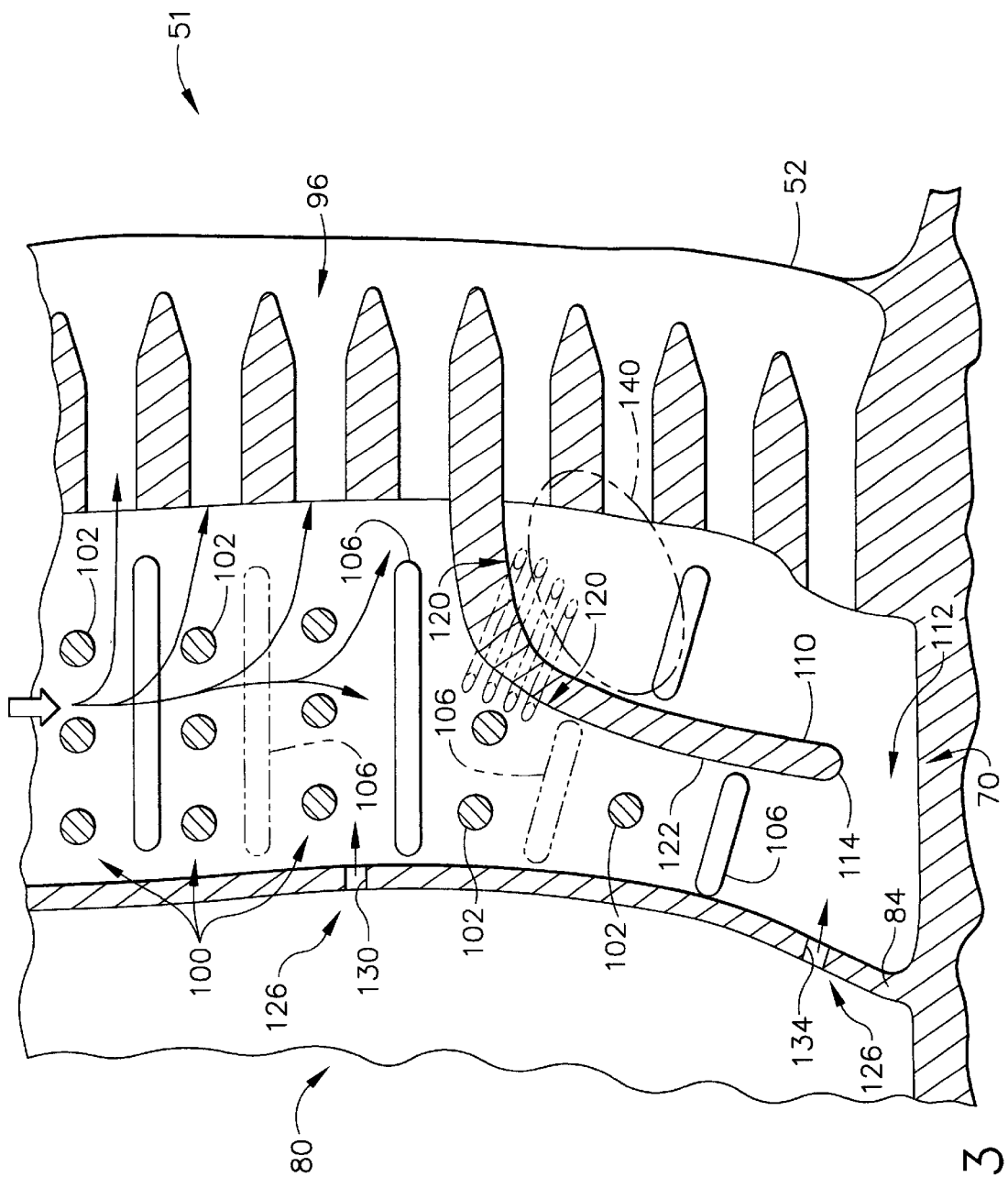
FIG. 3 is an enlarged schematic cross-sectional view of a cooling circuit that may be used with turbine nozzle shown in FIG. 2.
Figure 4:
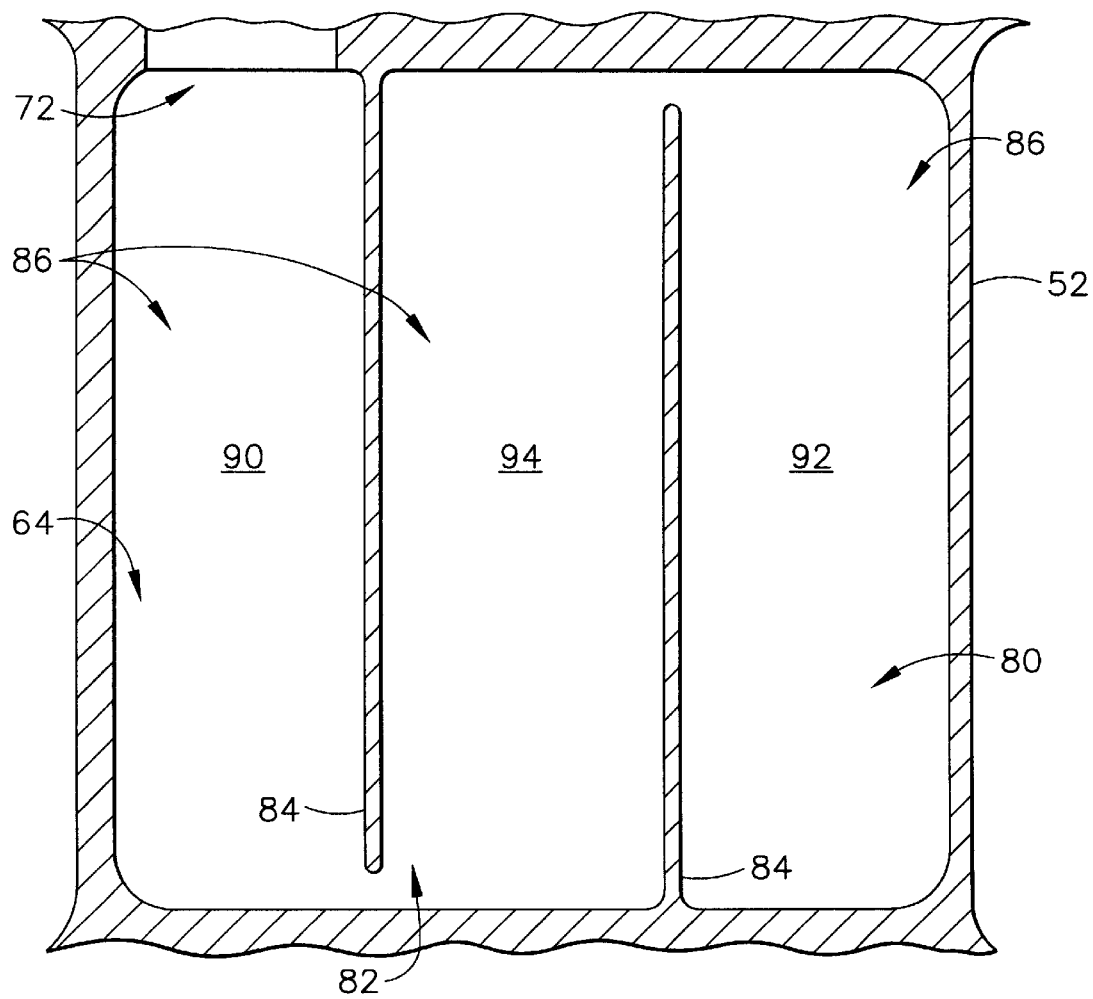
FIG. 4 is an exemplary schematic block diagram of a cooling cavity including a cooling circuit that may be used with the turbine nozzle assembly shown in FIG. 2.

FIG. 3 is an enlarged schematic cross-sectional view of a cooling circuit 80 that may be used with turbine nozzle assembly 50. FIG. 4 is an exemplary schematic block diagram of a cooling cavity 82 including cooling circuit 80. Each vane cooling cavity 82 is defined by an inner surface (not shown) of each vane 52. Cooling cavity 82 includes a plurality of inner walls 84 which partition cooling cavity 82 into a plurality of cooling chambers 86. The geometry and interrelationship of chambers 86 to walls 84 varies with the intended use of vane 52. More specifically, in the exemplary embodiment, each vane 52 includes a forward cooling chamber 90, an aft cooling chamber 92, and at least one mid cooling chamber 94. Chambers 90, 92, and 94 are bounded by airfoil first and second sidewalls 60 and 62, respectively (shown in FIG. 2).

In the exemplary embodiment, forward cooling chamber 90 extends longitudinally or radially through vane 52 to airfoil tip 72, and is bordered by airfoil first and second sidewalls 60 and 62, and by airfoil leading edge 64. Mid cooling chamber 94 is between forward cooling chamber 90 and aft cooling chamber 92. In one embodiment, chambers 90, 92, and 94 are in flow communication and form a serpentine cooling passageway extending through vane 52, such that primary cooling fluid supplied from mid cooling chamber 94 enters aft cooling chamber 92 adjacent airfoil vane tip 72.

Aft cooling chamber 92 extends longitudinally or radially through 52, and is bordered by airfoil first and second sidewalls 60 and 62, respectively, and by airfoil trailing edge 66. Cooling circuit 80 is defined within aft cooling chamber 92 and is upstream from an arrangement of trailing edge cooling slots 96, such that cooling fluid discharged from cooling circuit 80 exits vane 52 through trailing edge cooling slots 96. More specifically, primary cooling fluid is directed radially through chamber 92 into cooling circuit 80 prior to the fluid being channeled through trailing edge cooling slots 96.

A flow path through cooling circuit 80 is defined by a pin bank 100 that includes a plurality of pins 102, and by a plurality of turbulators 106 included within cooling circuit 80. Pins 102 extend between sidewalls 60 and 62 to facilitate increasing cooling effectiveness within airfoil vane 52. Turbulators 106 extend partially between sidewalls 60 and 62, and are spaced radially, such that a tortuous flowpath is defined therebetween. Turbulators 106 guide a portion of the cooling fluid passing therethrough through trailing edge cooling slots 96 and channel the remaining cooling fluid radially through cooling circuit 80. Pins 102 and turbulators 106 induce turbidity into cooling fluid flowing therein to facilitate increasing cooling effectiveness of cooling circuit 80.

Cooling circuit 80 also includes a control vane 110 which extends upstream from trailing edge slots 96. More specifically, control vane 110 is arcuate and extends from trailing edge slots 96 partially across chamber 92 towards airfoil vane root 70, such that a passageway 112 is defined between an end 114 of control vane 110 and root 70. Control vane 110 extends between sidewalls 60 and 62 to facilitate structurally enhancing nozzle 51, and thus facilitates reducing bulging stresses in airfoil vane 52 when used with advanced high pressure engines.

A plurality of cooling film openings 120 are positioned immediately upstream from control vane 110 along a leading edge side 122 of control vane 110. Openings 120 receive cooling fluid from upstream control vane 110 and discharge the fluid downstream from control vane 110 between control vane 110 and trailing edge slots 96.

Control circuit 80 also includes a pair of secondary cooling or resupply flow openings 126. More specifically, a first secondary opening 130 is positioned approximately midway through cooling circuit 80. Resupplied or secondary cooling fluid flow introduced through opening 130 is directed into circuit 80 towards trailing edge cooling slots 96. A second secondary cooling opening 134 is positioned adjacent airfoil vane 52 such that cooling fluid flow introduced through opening 134 is directed into circuit 80 towards trailing edge cooling slots 96 and through passageway 112. Additionally, because control vane 110 extends partially across chamber 92 towards mid cooling chamber 94, a cross-sectional area of the flow path within cooling circuit 80 is decreased, which facilitates maintaining a velocity of cooling fluid flowing through control vane 110.

In operation, cooling fluid is supplied to each airfoil vane cooling cavity 82. In one embodiment, nozzle cooling cavity 82 receives cooling air discharged from a compressor, such as compressor 14 (shown in FIG. 1). The cooling fluid is channeled through chambers 90 and 94 into chamber 92 and cooling circuit 80. As the cooling fluid flows through pin bank 100, a portion of the cooling fluid is directed aftward by pins 102 and turbulators 106 through trailing edge cooling slots 96. More specifically, as pins 102 and turbulators 106 direct cooling fluid aftward, the remaining cooling fluid directed is directed radially through cooling circuit 80 at a reduced velocity and pressure.

To enhance the cooling effectiveness of circuit 80 and to facilitate minimizing the effects of the reduced fluid velocity and pressure, additional cooling fluid, known as secondary or resupply cooling fluid, is supplied to cooling circuit 80 through first secondary opening 130. Opening 130 facilitates replenishing the cooling fluid within cooling circuit 80 that had been directed through trailing edge cooling slots 96. In one embodiment, the resupply cooling fluid is routed from chamber 94.

Downstream from opening 130, control vane 110 facilitates maintaining cooling fluid flow velocity and pressure within circuit 80. More specifically, the arcuate shape of control vane 110 decreases the cross sectional area of the flow path between vane 110 and chamber 94, which facilitates maintaining a velocity of the coolant fluid flow between vane 110 and chamber 94. Additionally, the arcuate shape of control vane 110 facilitates shifting a low internal pressure region 140 of vane 52 aftward to a location immediately downstream from vane 110 and between vane 110 and slots 96. More specifically, shifting low pressure area 140 aftward towards slots 96, facilitates improved backflow margin within vane 52 in comparison to other known nozzle vanes. Cooling fluid is channeled through film cooling openings 120 to facilitate cooling low pressure area 140 and to facilitate cooling trailing edge slots 96. As a portion of cooling fluid is directed through cooling openings 120 and aftward through trailing edge slots 96, the velocity and pressure is reduced of the remaining cooling fluid directed radially towards nozzle airfoil vane root 70.

To facilitate minimizing the effects of the reduced fluid velocity and pressure being directed towards an end of cooling circuit 80, additional cooling fluid, known as secondary or resupply cooling fluid, is supplied to cooling circuit 80 through second secondary opening 134. Opening 134 facilitates replenishing the cooling fluid within cooling circuit 80 that had been directed through trailing edge cooling slots 96. In one embodiment, the resupply cooling fluid is routed from chamber 94 through opening 134. More specifically, the additional cooling fluid supplied to circuit 80 through opening 134 facilitates increasing the velocity and pressure of the cooling fluid flowing around control vane 110 to enhance cooling of the remaining trailing edge cooling slots 96. More specifically, the combination of control vane 110 and resupply coolant directed through openings 130 and 134 facilitates providing balanced nozzle cooling within nozzle airfoil vane 52.

Airfoil vanes 52 are fabricated by casting a core (not shown). The core is fabricated by injecting a liquid ceramic and graphite slurry into a core die (not shown), and the slurry is heated to form a solid ceramic airfoil core. The airfoil core is suspended in an airfoil die (not shown) and hot wax is injected into the airfoil vane die to surround the ceramic airfoil core. The hot wax solidifies and forms a wax airfoil vane with the ceramic core suspended in the airfoil vane.

The wax airfoil vane with the ceramic core is then inserted into the airfoil vane die and molten metal is injected into the die. The molten metal melts, and takes the place of, the wax airfoil vane, and forms a metal airfoil vane with the ceramic core remaining in place. The airfoil vane is then cooled, and the ceramic core removed. Because nozzles 51 can be fabricated with an investment casting process, manufacturing costs associated with nozzles 51 are reduced in comparison to other known nozzles.

The above-described turbine nozzle includes a cooling circuit configuration that facilitates extending a useful life of the turbine nozzle. Each nozzle airfoil vane includes a plurality of pins, at least one turbulator, and a control vane. Additionally, the cooling circuit also includes at least one opening for receiving resupply cooling fluid therethrough. The combination of the turbulator and the resupply openings facilitates enhanced and balanced cooling effectiveness within each nozzle assembly. As a result, the cooling circuit configuration of the nozzles facilitates extending a useful life of the nozzles in a cost-effective and reliable manner.

While the invention has been described in terms of various specific embodiments, those skilled in the art will recognize that the invention can be practiced with modification within the spirit and scope of the claims.

What is claimed is:

1. A method for fabricating a nozzle for a gas turbine engine, the nozzle including an airfoil, said method comprising:

forming the airfoil to include a suction side and a pressure side connected at a leading edge and a trailing edge such that a cooling cavity and a cooling circuit are defined within the airfoil, wherein the suction side and the pressure side extend radially between a tip and a root;

forming a plurality of cooling slots within the airfoil that extend from the cooling circuit towards the airfoil trailing edge; and forming a control vane within the cooling circuit extending upstream from the cooling slots to facilitate decreasing a cross sectional area of the cooling circuit for maintaining a substantially constant cooling effectiveness within the cooling circuit.

2. A method in accordance with claim 1 wherein forming a control vane within the cooling circuit further comprises forming a plurality of film cooling holes upstream from the control vane to channel air from upstream from the control vane to downstream from the control vane.

3. A method in accordance with claim 1 wherein forming the airfoil to include a suction side and a pressure side further comprises forming the cooling circuit to include a primary cooling flow inlet that directs cooling flow into the cooling circuit at a location between the control vane and the nozzle tip, and at least one secondary cooling flow inlet that directs cooling flow into the cooling circuit at a location between the control vane and the nozzle root.

4. A method in accordance with claim 1 wherein forming the airfoil further comprises casting the airfoil.

5. A method in accordance with claim 1 wherein forming a control vane within the cooling circuit further comprises forming the control vane within the cooling circuit to extend arcuately from the cooling slots.

6. A method in accordance with claim 5 wherein forming the control vane within the cooling circuit further comprises forming the control vane to extend arcuately from the cooling slots towards the nozzle root.

7. A turbine nozzle for a gas turbine engine, said nozzle comprising an airfoil vane comprising a first wall, a second wall, a plurality of trailing edge cooling slots, and a cooling circuit extending between said first and second walls, said cooling circuit upstream from said trailing edge cooling slots for channeling cooling air to said trailing edge cooling slots, said cooling circuit comprising at least one control vane extending between said first and second walls, said control vane extending upstream from said trailing edge cooling slots and decreasing a cross sectional area of said cooling circuit for maintaining a substantially constant cooling effectiveness within said cooling circuit.

8. A turbine nozzle in accordance with claim 7 wherein said nozzle further comprises a root and a tip, said first and second walls extending radially between said root and said tip, said control vane is arcuate and extends upstream from said trailing edge cooling slots towards said nozzle root.

9. A turbine nozzle in accordance with claim 7 wherein said nozzle further comprises a cooling cavity, at least one cooling chamber defined between said first and second walls, said at least one cooling chamber upstream from said cooling circuit, said cooling circuit further comprises an inlet and an outlet, said inlet upstream from said control vane and in flow communication with said cooling cavity.

10. A turbine nozzle in accordance with claim 7 wherein said cooling circuit receives cooling air from said cooling cavity through said cooling circuit inlet, said cooling circuit further comprising at least one opening downstream from said cooling circuit inlet for receiving additional cooling air.

11. A turbine nozzle in accordance with claim 7 wherein said cooling circuit further comprises a plurality of pins extending between said nozzle first and second walls, said control vane configured to facilitate controlling back flow margin within said nozzle.

12. A turbine nozzle in accordance with claim 7 further comprising a plurality of cooling film holes upstream from said control vane.

13. A turbine nozzle in accordance with claim 12 wherein said cooling film holes channel air from upstream a leading edge side of said control vane to downstream a trailing edge side of said control vane.

14. An airfoil for a gas turbine engine nozzle, said airfoil comprising a root, a tip, a cooling circuit, a plurality of trailing edge cooling slots, a convex sidewall and a concave sidewall connected at a trailing edge, said plurality of trailing edge cooling slots extending from said cooling circuit towards said airfoil trailing edge, each said sidewall extending between said root and tip, said cooling circuit defined between said sidewalls and comprising a plurality of pins and a control vane, said plurality of pins and said control vane extending between said sidewalls and defining a flowpath for channeling cooling air through said cooling circuit into said trailing edge cooling slots, said control vane extending upstream from said trailing edge cooling slots such that a cross sectional area of said cooling circuit is decreased by said control vane to facilitate maintaining a substantially constant cooling effectiveness within said cooling circuit.

15. An airfoil in accordance with claim 14 wherein said cooling circuit control vane is arcuate and extends upstream from said plurality of trailing edge cooling slots towards said nozzle root, said control vane further configured to facilitate controlling back flow margin within said nozzle.

16. An airfoil in accordance with claim 14 wherein said cooling circuit further comprises at least one turbulator extending at least partially between said sidewalls.

17. An airfoil in accordance with claim 14 wherein said cooling circuit further comprises a plurality of cooling film openings upstream from said control vane.

18. An airfoil in accordance with claim 17 wherein said cooling film holes channel air from upstream of said control vane to downstream of said control vane.

19. An airfoil in accordance with claim 14 wherein said cooling circuit further comprises a primary cooling flow inlet that introduces cooling flow into said cooling circuit at a location upstream from said plurality of pins and said control vane.

20. An airfoil in accordance with claim 19 wherein said cooling circuit further comprises a secondary cooling flow inlet that introduces cooling flow into said cooling circuit at a location downstream from said plurality of pins.

* * * * *